Patented Jan. 14, 1936

2,027,714

UNITED STATES PATENT OFFICE 2,027,714

PROCESS OF MANUFACTURING BASIC MAGNESIUM CARBONATE

Samuel A. Abrahams, Redwood City, Calif., assignor to Plant Rubber & Asbestos Works, San Francisco, Calif., a corporation of California No Drawing. Application November 24, 1931, Serial No. 577,165

9 Claims. (Cl. 23—67)

My invention relates to an improved basic magnesium carbonate composition and the process of making the same, one object of my invention being to produce a basic magnesium carbonate precipitate having properties rendering the precipitate particularly adaptable for use in the manufacture of heat insulating material for pipe or boiler covering.

Another object is to provide a process for transforming magnesium carbonate precipitate to a form having increased volume per unit of weight and strength and reduced density.

Another object of my invention is to produce a basic magnesium carbonate precipitate yielding a composition in which the component particles are firmly bonded together to obtain increased strength, in a mass of low density.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Basic magnesium carbonate, such as heretofore commonly used in the manufacture of heat insulating material such as pipe or boiler covering, has been found defective in that compositions having a density sufficiently low to obtain insulating efficiency have been of such a weakly bonded nature that much difficulty has been encountered in forming, handling, and applying the material to its intended use. Compositions treated to increase the strength of the material have resulted in an increase in the density such that the insulating efficiency is objectionably impaired.

Broadly my invention comprises the product and process of precipitating and transforming basic magnesium carbonate into a form, having low density, increased volume per unit of weight, and a strongly bonded nature, and affording both strength and insulating efficiency. The precipitate is obtained initially by adding precipitants in solutions of calculated nature and strength to a bittern or other magnesium salt solution in a volume of characteristic proportion, and is transformed by subjecting the mixture to heat treatment by the introduction of steam whereby the initial magnesium carbonate precipitate is transformed to a precipitate characterized by the presence of a multitude of long needle like crystals intimately mixed with substantially non-crystalline particles of a relatively finely divided character which are strongly bonded together by the crystals in a mass having relatively low density and increased volume.

More specifically, my invention comprises the product and process of precipitating basic magnesium carbonate from bitterns such as remain as residual liquors after the largest practicable amount of sodium chloride has been crystallized out by the evaporation of sea water. I prefer to use a bittern having a gravity of from 27° to 29° Baumé. However, satisfactory results may be obtained from a solution of 25° Baumé or from a mixture of a weak bittern (20°–25°) and a strong bittern (30°–32°) mixed in appropriate proportions. Other magnesium salt solutions may be substituted in part or in whole for sea water bittern if desired.

Basic magnesium carbonate is first precipitated from the bittern or magnesium salt solution preferably by adding thereto a solution of sodium carbonate with which I prefer to use a minor portion of sodium bicarbonate. For this purpose I prefer to use a major portion of what is known commercially as the "light" grade of sodium carbonate, as I have discovered that the "light" grade produces results decidedly superior to the use of the commercially designated "heavy" or dense grade. The reason for this difference is not known, but experiments and practice have proved it to be true. Some of the heavy grade of sodium carbonate may be used, but along with it should be used not less than 30%, and preferably 50% or more, of the light grade sodium carbonate. The terms "light" and "heavy" are used in their ordinary commercial significance, the "light" grade being a product which weighs approximately 40 pounds per cubic foot and the "heavy" or "dense" grade weighing approximately 65 pounds per cubic foot.

In addition to the sodium carbonate I prefer to add a minor portion of sodium bicarbonate for the purpose of providing an excess of carbonic oxide over that required for a stoichiometric precipitation of the magnesium salt. The proportion of bicarbonate of soda should not be less than 5% and need not be greater than 25% by weight of the total sodium carbonate and bicarbonate added. The quantity of sodium bicarbonate should be increased proportionately if heavy sodium carbonate is used, as the effect of the heavy carbonate may be countered by increasing the amount of sodium bicarbonate used. The sodium carbonate and sodium bicarbonate preferably are added separately in separate solutions. However, suitable mixtures of carbonate and bicarbonate containing the requisite amount of light carbonate may be used if care is taken to maintain a correct proportioning of the ingredients.

The presence of sodium bicarbonate may also be obtained by introducing carbon dioxide gas into the sodium carbonate solution to convert a portion of the carbonate to bicarbonate. This is preferably done prior to adding the sodium carbonate solution to the bittern, but may also be done during and immediately following the introduction of the sodium carbonate into the bittern or magnesium salts solution.

In my present practice, I have found that a satisfactory result may be obtained by the use of trona as the precipitating agent. In the crude natural state, trona contains approximately 34% sodium carbonate and approximately 25% sodium bicarbonate. When the crude trona is subjected to calcination, carbon dioxide is driven off from the bicarbonate and the percentage of sodium carbonate is increased. In the calcined trona, the percentage of sodium carbonate may be increased to 60% or more, the percentage of sodium bicarbonate being reduced proportionately. I prefer to use a sufficient quantity of the calcined trona to obtain the required amount of sodium carbonate as the major precipitant. In addition to the calcined trona, I also use a suitable amount of the uncalcined trona to provide the requisite amount of sodium bicarbonate. The calcined and the uncalcined trona are preferably added separately in separate solutions.

The precipitating agents are added to the bittern or magnesium salt solution preferably in a container approximately 8 feet in diameter and approximately 24 feet in depth, the container being filled to a depth of not less than 6 feet and preferably to a depth of 12 feet or more. In such a container I prefer to introduce approximately 1,400 gallons of the bittern or magnesium salt solution. To this solution is added 1,200 gallons of a solution of sodium carbonate and 200 gallons of a solution of sodium bicarbonate, the latter solutions being calculated stoichiometrically with respect to the quantity of magnesium salt present in the bittern. For bittern of 27°–29° Baumé, a sodium carbonate solution of 17° Baumé and a sodium bicarbonate solution of 8° Baumé produce the most satisfactory results.

The combined solutions and the precipitate which is formed, are subjected to heat treatment by steam introduced into the bottom of the container. The steam is preferably introduced into the container at substantially 100 pounds pressure and at the rate of approximately 3,500 pounds per hour until the temperature of the combined solutions exceeds approximately 160° F. This temperature is normally reached in about one hour. The heat treatment is preferably carried out in the same vessel in which the solutions are originally mixed and in which the original precipitation occurs, but the mixed solutions and precipitates may be transferred to a different container of the proportions above noted for heat treatment if desired.

During heat treatment the precipitate undergoes a peculiar transformation. This transformation is illustrated by the results obtained from control samples taken from the bottom of the container during the course of the heat treatment and filtered through an open mesh filter paper in a Buchner funnel approximately 2½ inches deep, so that a total depth of 2½ inches of material over the whole area of the funnel is filtered. Such samples show:

1. Immediately after precipitation and before the admission of steam, a depth of precipitate in the funnel of about ⅜ inch.
2. At a temperature of about 120° F., a depth of about ⅛ inch.
3. At a temperature of about 150° F., a depth of about $\tfrac{5}{16}$ inch.
4. At a temperature of 160–180° F., a depth of about $\tfrac{11}{16}$ inch.

A microscopic examination of the precipitate at these temperatures shows first an essentially fine needle-like crystalline form. This original precipitate is broken down into a dense mass of finely divided particles with a corresponding shrinkage of volume. Finally the precipitate is transformed to an expanded form presenting the appearance of many needle-like forms larger than the crystals first formed, and intermingled with a mass of substantially non-crystalline particles.

The reasons for the transformation above described are not fully understood. It is believed that this transformation is a result principally of the heat treatment and the nature and method of adding the precipitants. It is also thought that the transformation may depend in part upon the depth of the solution treated and the diameter of the column of solution as well as upon the concentration of the solutions used.

There are two critical temperatures reached in the course of the heat treatment. The first critical temperature is at about 120° F. As the temperature approaches this point, a visible action occurs within the container, the lower portion of the solution seeming to rise or well up within the container and the upper portion to roll over and become submerged under a suddenly rising volume of the heated lower portion of the solution. It is thought that this first phenomena is due in part to the greater temperature at the bottom of the container and in part to the liberation of a portion of the relatively loosely bonded carbonic oxide gas in the mixture. This action does not occur properly if the depth of solution is less than 6 feet and occurs best when the depth of solution is 12 feet or more. During this action, it is thought that the precipitate breaks down to a fine sandy crystalline product which results in a shrinkage of the volume.

The second critical temperature is reached at about 160° F. At about this point a second visible action begins within the container. The action is usually accompanied by an apparent turning over of the solution within the container and is followed by rapid expansion and welling up within the container. This action is probably due to the increase in temperature and the sudden liberation of carbonic oxide. During this second action the precipitate becomes transformed to a mixture of long needle-like crystals intermixed with a mass of light relatively noncrystalline precipitate. It is thought that this mixture of crystalline and non-crystalline precipitate is the result of different temperatures prevailing in different portions of the solution. The heat treatment by steam must be kept within close limits, as continued heating after the second action is complete causes a material increase in the density and finess of the product and a material reduction in the strength and volume of the precipitate. If the temperature is allowed to exceed 200° F. the quality of the product is greatly impaired.

The mixture is of a thin mushy consistency such that convection currents are substantially precluded. It is thought that the relatively thick consistency of the mixture, combined with the diameter of the column and the depth of the mixture is responsible for the visible action noted at the critical temperatures mentioned. The mixture is not agitated during the heat treatment as agitation results in forming a precipitate of substantially uniform crystalline character having a smaller volume and greater density, and in which the particles are less strongly bonded together.

Successful results may be obtained when larger quantities of solution are used provided the relative proportioning of the magnesium salt solution and precipitating solutions is kept uniform. However, larger quantities of solution cannot be handled conveniently, and hence the upper limit to the size of batches is a matter of convenience rather than of the quality of product.

After the heat treatment has been completed as above described, the precipitate is filtered and washed in the ordinary manner, and the separated precipitate is treated in the usual manner to prepare the material for an intended use, for example, pipe or boiler covering material.

I claim:

1. The process of preparing basic magnesium carbonate for insulating material which comprises adding to approximately 1400 gallons of 27°–29° Baumé bittern a substantially equal bulk of solution containing a stoichiometrically calculated amount of precipitant comprising sodium carbonate and sodium bicarbonate for precipitating basic magnesium carbonate, and transforming the initial precipitate to a relatively light strongly bonded mass having increased volume and strength by introducing steam into the lower portion of the mixture of liquid and precipitate at approximately 100 pounds pressure and at the rate of approximately 3500 pounds per hour until the mixture is raised to a temperature of 160° to 200° F.

2. The process of preparing basic magnesium carbonate for insulating material which comprises adding sodium carbonate and sodium bicarbonate to a magnesium salt solution in amounts suitable for precipitating an initial basic magnesium carbonate precipitate which is transformable to an altered form, and then introducing steam into the mixture of liquid and precipitate until the temperature of the mixture is raised to approximately 160°–200° F. for transforming the initial precipitate to a relatively light strongly bonded form having increased volume per unit of weight and also having increased bonding properties.

3. The process of preparing basic magnesium carbonate for insulating material which comprises adding sodium carbonate and sodium bicarbonate separately to a magnesium salt solution in amounts suitable for precipitating an initial basic magnesium carbonate precipitate which is transformable to an altered form, and then introducing steam into the mixture of liquid and precipitate until the temperature is raised to approximately 160°–200° F. for transforming the initial precipitate to a relatively light strongly bonded form having increased volume per unit of weight and also having increased bonding properties.

4. The process of preparing basic magnesium carbonate for insulating material which comprises adding sodium carbonate and sodium bicarbonate separately to a magnesium salt solution in amounts suitable for precipitating an initial basic magnesium carbonate precipitate which is transformable to an altered form, and then introducing steam into the mixture of liquid and precipitate in a container filled to a depth exceeding approximately six feet until the temperature is raised to approximately 160°–200° F. for transforming the initial precipitate to a relatively light strongly bonded form having increased volume per unit of weight and also having increased bonding properties.

5. The process of preparing basic magnesium carbonate for insulating material which comprises adding sodium carbonate and sodium bicarbonate to a bittern of approximately 25°–30° Baumé gravity in amounts suitable for precipitating an initial basic magnesium carbonate precipitate which is transformable to an altered form, and then introducing steam into the mixture of liquid and precipitate until the temperature of the mixture is raised to approximately 160°–200° F. for transforming the initial precipitate to a relatively light strongly bonded form having increased volume per unit of weight and having increased bonding properties.

6. The process of preparing basic magnesium carbonate for insulating material which comprises adding sodium carbonate and sodium bicarbonate in separate solutions to a bittern of approximately 25°–30° Baumé gravity in amounts suitable for precipitating an initial basic magnesium carbonate precipitate which is transformable to an altered form, and then introducing steam into the mixture of liquid and precipitate until the temperature of the mixture is raised to approximately 160°–200° F. for transforming the initial precipitate to a relatively light strongly bonded form having increased volume per unit of weight and having increased bonding properties.

7. The process of preparing basic magnesium carbonate for insulating material which comprises adding sodium carbonate and sodium bicarbonate separately to a bittern of approximately 25°–30° Baumé gravity in amounts suitable for precipitating an initial basic magnesium carbonate precipitate which is transformable to an altered form, and then introducing steam into the mixture of liquid and precipitate in a large container filled to a depth of approximately six feet until the temperature is raised to approximately 160°–200° F. for transforming the initial precipitate to a relatively light strongly bonded form having increased volume per unit of weight and having increased bonding properties.

8. The process of preparing basic magnesium carbonate for insulating material which comprises introducing a measured amount of bittern into a container, adding sodium carbonate and sodium bicarbonate to the bittern in amounts suitable for producing an initial basic magnesium carbonate precipitate which is transformable to an altered form, and thereafter introducing steam into the lower portion of the container at approximately 100 pounds pressure and at the rate of approximately 3,500 pounds per hour until the temperature of the mixture is raised to approximately 160°–200° F. for transforming the initial precipitate to a relatively light strongly bonded form having increased volume per unit of weight and increased bonding properties.

9. The process of preparing basic magnesium carbonate for insulating material which comprises introducing a measured amount of bittern into a container, separately adding sodium carbonate and sodium bicarbonate in an amount approximately 5%–25% of the sodium carbonate to the bittern to produce an initial basic magnesium carbonate precipitate, and thereafter introducing steam into the lower portion of the container at approximately 100 pounds pressure and at the rate of approximately 3,500 pounds per hour until the temperature of the mixture is raised to approximately 160°–200° F. for transforming the initial precipitate to a relatively light strongly bonded form having increased volume per unit of weight and increased bonding properties.

SAMUEL A. ABRAHAMS.